United States Patent [19]

Mitiakoudis et al.

[11] Patent Number: 4,806,623

[45] Date of Patent: Feb. 21, 1989

[54] POLY(P-PHENYLENE-2,5-FURANDICAR-BONAMIDE), ANISOTROPIC SOLUTION, FILAMENT, FILM THEREOF

[75] Inventors: Anastassios Mitiakoudis; Alessandro Gandini, both of St. Martin-d'Hères, France

[73] Assignee: Stamicarbon B.V., Geleen, Netherlands

[21] Appl. No.: 87,224

[22] Filed: Aug. 20, 1987

[30] Foreign Application Priority Data

Aug. 20, 1986 [NL] Netherlands ............... 8602116

[51] Int. Cl.$^4$ .............................. C08G 69/26
[52] U.S. Cl. .................... 528/341; 524/104; 524/401; 524/606; 528/336; 528/342; 528/347
[58] Field of Search ............. 528/341, 342, 336; 524/606, 104, 401

[56] References Cited

U.S. PATENT DOCUMENTS

| | | | |
|---|---|---|---|
| 4,123,424 | 10/1978 | Credali et al. | 528/341 |
| 4,129,559 | 12/1978 | Credali et al. | 528/341 |

OTHER PUBLICATIONS

Chemical Abstracts No. 196500a, vol. 103, 1985.
Polym. Commun., 26 (8), pp. 246–249 (1985).

*Primary Examiner*—Harold D. Anderson
*Attorney, Agent, or Firm*—Cushman, Darby & Cushman

[57] ABSTRACT

Poly(p-phenylene-2,5,furandicarbonamide), with an inherent viscosity of at least 1.5 dl/g measured at 30° C. on a 5 g/dl solution in 98% sulphuric acid, is prepared by performing the condensation at 100° C. at most and using a molar excess of triphenylphosphite of 1–20% in respect to the total amounts of p-phenyleediamine and 2,5-furandicarboxylic acid which are started from. Anisotropic solutions of the aforementioned polyamide, filaments and films thereof are disclosed.

4 Claims, No Drawings

POLY(P-PHENYLENE-2,5-FURANDICARBONA-MIDE), ANISOTROPIC SOLUTION, FILAMENT, FILM THEREOF

The present invention relates to poly(p-phenylene-2,5-furandicarbonamide) and anistropic solutions thereof. The invention also relates to the processing of the aforementioned polyamide, where appropriate the anisotropic solutions thereof into filaments and films and into filaments and films of poly(p-phenylene-2,5-furandicarbonamide).

Polycondensates of 2,5-furandicarboxylic acid and p-phenyenediamine are known from publications by A. Gandini, M. C. Salon, A. Mitiakoudis and H. Cheradame in 'Furan Chemistry', Bratislava, University Press, 1984, pages 33 ff. and by A. Mitiakoudis, A. Gandini and H. Cheradame in Polymer Communications 26 (1985), 246-249, in which, as in earlier publications, inter alia these one by P. M. Heertjes and G. J. in 'Delft Progress Reports', 1974, A1 59-63, also polycondensates of 2,5-furandicarboxylic acid with other diamines are described. These polycondensates have till now not received any practical significance. Nothing is mentioned about the mechanical properties such as tensile strength, modulus, elongation, etc.

Since several years there has been a great interest in fully aromatic polyamides, such as poly(p-phenyleneterephthalamide), because of their mechanical and physical properties, especially their high tensile strength and modulus, which make them hiqhly suitable for being processed into filaments and films.

Filaments have of old been stretched during or immediately after the spinning to increase their mechanical properties, notably their strength and modulus. Also films are often stretched for this purpose. The improvement of mechanical properties is a result of the orientation of the molecules during the stretching. It has been found that orientation of the molecules in the melt or in solution before processing them into filaments or films, is very important to obtain good mechanical properties.

Molecules oriented in the melt or in solution were already known in the last century as 'liquid crystals'. Recently a more detailed research was made of polymeric liquid crystals based on rod-shaped molecules and/or rigid chain structures. In literature, properties have been described of ultrastrong fibres with very high modulus of rod-shaped polymers, of which most show a liquid crystal behaviour in the melt or in solution. A good summary of the liquid crystal phenomenon, in which attention is given to polymeric liquid crystals, is described in the article by D. B. DuPré in Kirk-Othmer; Encyclopedia of Chemical Technology, 3rd edition John Wiley & Sons, New York 1981 volume 14 395-427.

More detailed information about the circumstances in which anisotropy in the melt or in solution can occur, or indeed cannot occur, is given by J. Preston, Die Angewandte Makromolekulare Chemie 109/110 (1982) 1-19. This reference shows the previously calculated maximum length-diameter ratio of molecules of 6.4, above which there can be no anisotropy in the melt. The degree of polymerization of polyamides processed into filaments is that high, that the length-diameter ratio is well above the value of 6.4.

Also if the length-diameter ratio of oolyamides is lower than 6.4, no anisotropy will occur in the melt, although the other conditions, viz. a rod-shaped molecule with rigid chain, have indeed been complied with. It has been found that anisotropy can occur in solutions. It is assued that the nematic structure of polyamides in a liquid crystalline state mainly occurs if the molecules can easily slide past each other. This is not the case with polyamides because of the formation of hydrogen bridges. With polyamides the intermolecular hydrogen bridges must be as weak as possible in order to be able to obtain a liquid crystalline state.

The processing, notably the spinning of polyamides from solutions, has many advantages. First of all, the melting points of the polyamides are high. Such high temperatures do not only present problems in the processing, but mostly a varying degree of decomposition will occur as well, which is a substantial disadvantage. For the appearance of anisotropy in solutions, the length-diameter ratio of the molecule has to be more than 6.4, and in principle it is possible to minimize the intermolecular hydrogen bridge formation by choosing a suitable solvent.

Solutions of the poly(p-phenylene-2,5-furandicarbonamide) synthesized by Mitiakoudis et al. (IBID) having an inherent viscosity of 1.33, the highest inherent viscosity of the described polyamides were found to be isotropic in the LiCl-containing solvents of the amide type such as DMF (dimethylformamide), DMA (dimethylacetamide), HMPA (hexamethylphosphorotriamide) and NMP (N-methylpyrrolidone) known for polyamides and it seemed to be impossible, even with very high concentrations, to obtain anisotropic solutions in the mentioned solvents.

It has now surprisingly been found that not earlier synthesized poly(p-phenylene-2,5-furandicarbonamide) with an inherent viscosity of at least 1.5, measured at 30° C. on a solution of 0.5 g/dl in 98% sulphuric acid, is capable to dissolve in N-methylpyrrolidone containing at least 2 wt. % LiCl, to form an anisotropic solution that is spinable into filaments with high strength and modulus. Solutions of poly(p-phenylene-2,5-furadicarbonamide) with inherent viscosities of 1.5-2.1 dissolve in other LiCl-containing solvents, such as DMA or DMF, to form isotropic solutions. Even with concentrations of about 30% (wt/vol) the solutions will still be isotropic.

For the appearance of anisotropy a certain minimum concentration is required, depending on the length-diameter ratio of the polymer molecule and consequently indirectly on the molecular weight. Preston (IBID) mentions the relation already known in the art $$V_{kr} = \frac{8}{X}\left(1 - \frac{2}{X}\right)$$

$V_{kr}$ is the critical volume concentration of the polymer and X the length-diameter ratio of the polymer molecule. With increasing length-diameter ratio, i.e. with increasing molecular weight, the critical volume concentration will be smaller.

The occurence of anisotropy in the solution also depends on the temperature that's why there is a critical temperature above which the solution will be isotropic. It will be easy for a man skilled in the art to determine by experiment the concentrations and temperatures at which readily processable anisotropic solutions are obtained.

Anisotropy of the solutions can easily be determined under a polarization microscope. When solutions are prepared with increasing concentrations, turbid i.e. anisotropic solutions are obtained, above a critical value. Owing to the development of mostly a subtantially nematic arrangement, in which the molecules will readily slide past each other, the viscosity of the solution will decrease as soon as anisotropy occurs with increasing concentration, wheeeas in isotropic solutions, with rising concentrations, the viscosity normally increases. The turning point in viscosity marks the beginning of the anisotropic concentration range (see Kirk-Othmer IBID page 417).

Poly(p-phenylene-2,5-furandicarbonamide) can be prepared according to processes known in the art, as described by Mitiakoudis et al. (IBID). The highest inherent viscosities are obtained by 'direct' polymerization in solution according to a process developed by Higashi et al. J. Pol. Sci. Pol. Chem. Ed. 20 (1982) p. 2081 ff. for poly(-phenyleneterephthalamide). It was found that the inherent viscosity can be influenced by the temperature and by the amount of triphenylphosphite.

Mitiakoudis et al. (IBID) prepared a poly(p-phenylene-2,5-furandicarbonamide) with an inherent viscosity of 1.33 by performing the polycondensation of p-phenylenediamine and 2,5-furandi-carboxylic acid at 100° C. in a 5:1 (vol/vol) mixture of N- methyl-pyrrolidone and pyridine containing $CaCl_2$ and LiCl in a molar ratio of 1.14 and triphenylphosphite in an equimolar amount in respect of the total molar amount of p-phenylenediamine and 2,5-furadicarboxylic acid. The total molar amount of salts was 0.4 of the number of moles of pyridine.

By a suitable modification of that process poly(p-phenylene-2,5-furandicarbonamides) can be prepared with varying molecular weight. Such polycondensates can notably be prepared with inherent viscosities of at least 1.5.

The polyamides in question have a melting point above 300°C. and cannot or hardly be processed without decomposition from the melt. For the processing into filaments and films preferably solutions are started from and most preferably anisotropic solutions, because these will provide the highest strengths and moduli. The solvents used may be LiCl-containing solvents of the amide type, as already explained hereinbefore. Anisotropic solutions are only obtained in N-methylpyrrolidone (NMP) containing at least 2 wt. % LiCl.

Filaments can be produced according to processes for the spinning of solutions known from the spinning technique, in which all known modifications for that purpose can be applied, such as directly spinning in a coagulating bath or in a gaseous or vaporous medium, etc. Also films can be produced applying all processes customary for that purpose, as for instance by casting on a plate, extruding through a slit die, etc.

The processing as such into filaments or films does not come within the scope of the invention, however what does is the processing according to known processes per se of poly(p-phenylene-2,5-furadicarbonamide) with inherent viscosities of at least 1.5 in solutions of NMP containing at least 2 wt. % LiCl, measured at 30° C. on 0.5 g/dl solutions in 98-% sulphuric acid.

The invention is further illustrated by the following examples without, however, being limited by them.

EXAMPLE 1

In a flask of 1 provided with a stirrer 12.9 g (0.12 mole) p-phenylenediamine, 18.7 g (0.12 mole) 2,5-furadicarboxylic acid and 74.4 g (0.24 mole) triphenylphosphite are introduced. All three compounds have been purified and carefully dried in advance. In a nitrogenatmosphere a mixture is added to these of 600 ml (6.22 moles) NMP (N-methylpyrrolidone) and 120 ml (1.50 moles) pyridine, in which previously 12 g (0.28 mole) LiCl and 35 g (0.32 mole) $CaCl_2$ were dissolved. While being stirred, the reaction mixture is heated at 90° C. for 14 hours. The resulting viscous solution is slowly poured out into an excess of methanol.

The light-yellow precipitate is separated and washed twice with boiling methanol and once with acetone.

The polyamide, thus prepared, is dried under vacuum at about 100° C. for 24 hours. The inherent viscosity is 2.1 dl/g.

EXAMPLE 2

Example 1 was repeated at different reaction temperatures. At a reaction temperature of 95° C. a polyamide with an inherent viscosity of 1.7 was obtained. At 100° C. the inherent viscosity was 1.3 and at 120° C. only 1.1. This shows that under these reaction conditions the present polyamides with inherent viscosities of at least 1.5 are obtained at reaction temperatures lower than 100° C.

EXAMPLE 3

Example 1 was repeated, it being understood that this time different amounts of triphenylphosphite were used and that the reaction time was 48 hours. When 82 g (0.264 mole) triphenylphosphite, i.e. an excess of 10%, was used, a polyamide with an inherent viscosity of 2.35 was obtained. Using a 10% less amount of triphenylphosphite, a polyamide with an inherent viscosity of 1.72 was obtained. With an equimolar amount of triphenylphosphite as in example 1, a polyamide with an inherent viscosity of 2.1 was obtained also in a 48 hour reaction period.

EXAMPLE 4

Preparation of anisotropic solutions

Poly(p-phenylene-2,5-furadicarbonamide) with an inherent viscosity of 2.1 was dissolved to different concentrations in a solvent consisting of a solution of 4 g LiCl per 100 ml N-methylpyrrolidone. The dissolution process was accelerated by gently heating during stirring at temperatures of 50°-60° C. Often the resulting solution was not clear because the solution was anisotropic.

A solution was prepared containing 11 g polymer per 100 ml solvent. This solution was clear at room temperature and showed no double refraction under a polarization microscope.

A solution was prepared, containing 12 g polymer per 100 ml solvent, which was slightly turbid at room temperature and showing double refraction under a polarization microscope.

In the same way solutions were prepared containing 13, 14, 15 respectively 20 g poly(p-phenylene-2,5-furandicarbonamide) with an inherent viscosity of 2.1 per 100 ml solvent. All solutions were turbid at room temperature and increasingly viscous. Indeed, at room temperature the 20 g/100 ml solution was even semi-solid.

The solutions prepared according to this example were heated under a polarization microscope at a rate of 4° C. per minute, and the temperature at which the double refraction disappeared, i.e. at which the solution became isotropic instead of being anisotropic, was recorded. In the 12 g/100 ml-containing solution it happened at 40° C.; in the 13 g/100 ml-containing solution at 45° C., in the 14 g/100 ml-containing solution at 52° C., in the 15 g/100 ml-containing solution at 65° C. and in the 20 g/100 ml-containing solution at 98° C.

EXAMPLE 5

In conformity with the process described in example 4, poly(p-phenylene-2,5-furandicarbonamide) with an inherent viscosity of 2.1 was dissolved in NMP containing 4 g/100 ml LiCl till a 20 g/100 ml-containing solution was obtained. This solution was poured on to glass sheets at 65° C. and at 100°–105° C. and spread with a rake, so that films were obtained with different thicknesses. After cooling to ambient temperature the sheets with the films on top were washed in acetone, upon which the films were torn from the sheets and were liberated under vacuum at ambient temperature of any solvent, respectively washing liquid. The films casted at 65° C., i.e. from an anisotropic solution, are opaque and tough. The films casted at 100°–105° C., i.e. above the critical temperature of an isotropic solution, are clear and brittle. Using an Instron tester, the tensile strengths and the moduli were measured on test samples cut from the films.

The results of these measurements are summarized in the table below.

| test | temperature | film thickness $\mu m$ | tensile strength MPa | modulus $1 \times 10^9 \text{ N/m}^2$ |
| --- | --- | --- | --- | --- |
| A | 65 | 42.5 | 501 | 18.7 |
| B | 65 | 165 | 169 | 5.4 |
| C | 100–105 | 100 | 154 | 2.4 |
| D | 100–105 | 200 | 151 | 2.2 |

The reference to a casting temperature of, 100°–105° C. means that the temperature was in any case at least 100° C. Minor deviations from the casting temperature are apt to occur. If the temperature should fall unintentionally a few degrees below 100° C., anisotropy might occur. It will be clear that with a casting temperature of 65° C. small deviations in temperature are not important.

The tensile strength and the modulus of films made of anisotropic solutions (at 65° C.) have been found to be substantially higher than of films made (at at least 100° C.) of isotropic solutions. The thickness of films A and B, made of anisotropic solutions is important. The thinner the film the better the orientation. This is confirmed by the definitely higher tensile strength and modulus of film A compared with film B. The thickness of the isotropic films C and D plays hardly a part. When these isotropic solutions are spread with a rake there will indeed be a slightly increased orientation as the film is thinner, but the orientation continues to be very low. The tensile strength and modulus of film C are indeed slightly higher than those of film D, but the differences are small.

We claim:
1. Poly(p-phenylene-2,5-furandicarbonamide)having an inherent viscosity of at least 1.5 dL/g measured at 30° C. on a 0.5 g/dL-solution in 98% sulphuric acid.
2. Anisotropic solution of poly(phenylene-2,5-furandicarbonamide) according to claim 1 in N-methylpyrrolidone in which at least 2 g LiCL per 100 ml N-methylpyrrolidone has been dissolved.
3. Filament or film of poly(p-phenylene-2,5-furandicarbonamide) according to claim 1 prepared from an anisotropic solution.
4. Filament or film of poly(p-phenylene-2,5-furandicarbonamide) according to claim 3 having a modulus of at least $5 \times 10^9$ N/M$^2$.